April 26, 1960 R. W. WAGNER 2,933,928
POWER TAKE-OFF
Filed June 26, 1956 2 Sheets-Sheet 1

INVENTOR
ROBERT W. WAGNER
BY
ATTORNEY

April 26, 1960

R. W. WAGNER 2,933,928

POWER TAKE-OFF

Filed June 26, 1956

2 Sheets-Sheet 2

INVENTOR
ROBERT W. WAGNER
BY *Lumsen J. Beaman*
ATTORNEY

United States Patent Office 2,933,928
Patented Apr. 26, 1960

2,933,928

POWER TAKE-OFF

Robert W. Wagner, Chelsea, Mich., assignor to Dana Corporation, Toledo, Ohio, a corporation of Virginia Application June 26, 1956, Serial No. 593,932

1 Claim. (Cl. 74—15.86)

The invention relates to power take-off mechanism and the shifting mechanism thereof used upon trucks and other vehicles to transmit power to auxiliary equipment, being an improvement on the power take-off disclosed in my Patent No. 2,578,867.

More specifically the invention is concerned with the type of power take-off attached to the gear or transmission housing of a vehicle, the gears of the power take-off meshing with the gears of the transmission to impart power to the power take-off output shaft. To engage and disengage the power take-off, a gear of the take-off is moved axially into or out of mesh with the gear of the transmission, such movement being accomplished by the operator through suitable remote control means.

In order to provide a power take-off which may be used with a variety of transmissions it is desired to construct a power take-off unit which may be readily adapted to existing transmissions and easily modified to the proper operating conditions.

Therefore, it is an object of the present invention to produce a power take-off which is economical to manufacture and which may be adapted to various types of transmissions.

It is a further object of the invention to provide a power take-off which is compact in design, has a minimum of moving parts and produces a positive locking system for holding the power take-off in either engagement or disengagement with the drive gear of the transmission.

Another object of the invention is to design a power take-off which may be selectively assembled to accommodate transmission requiring different clutching movements.

Figure 2:
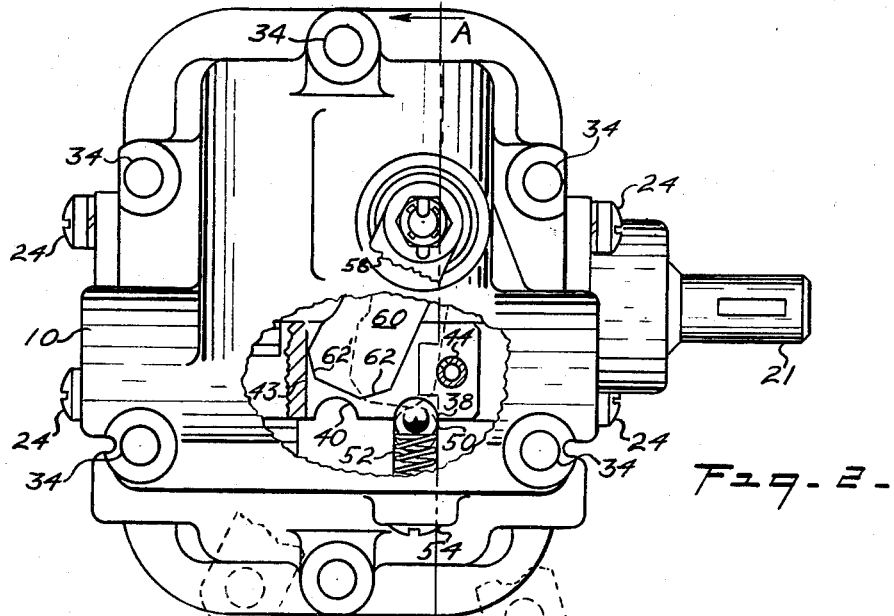
Figure 1:
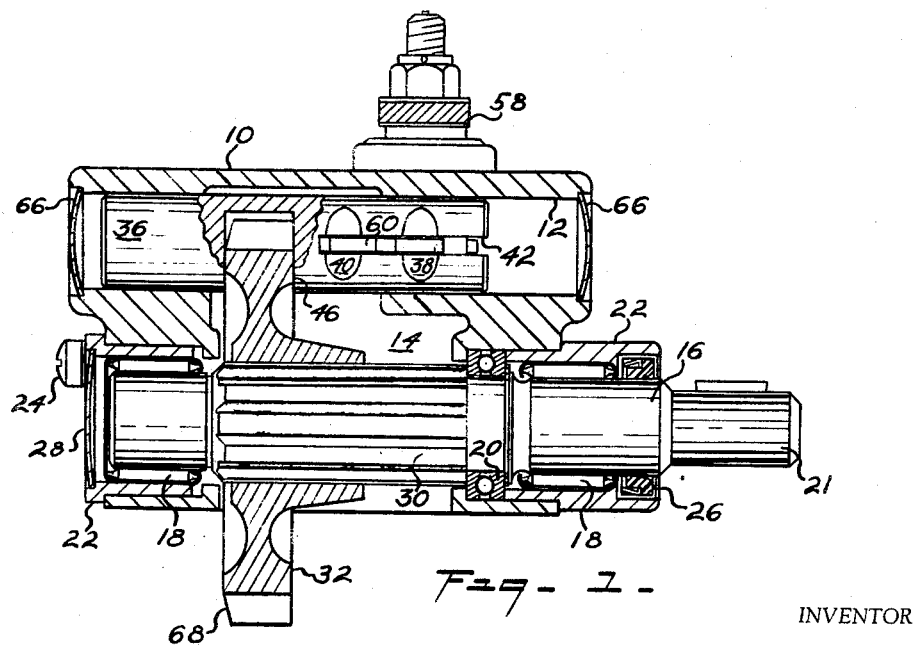
Figure 3:
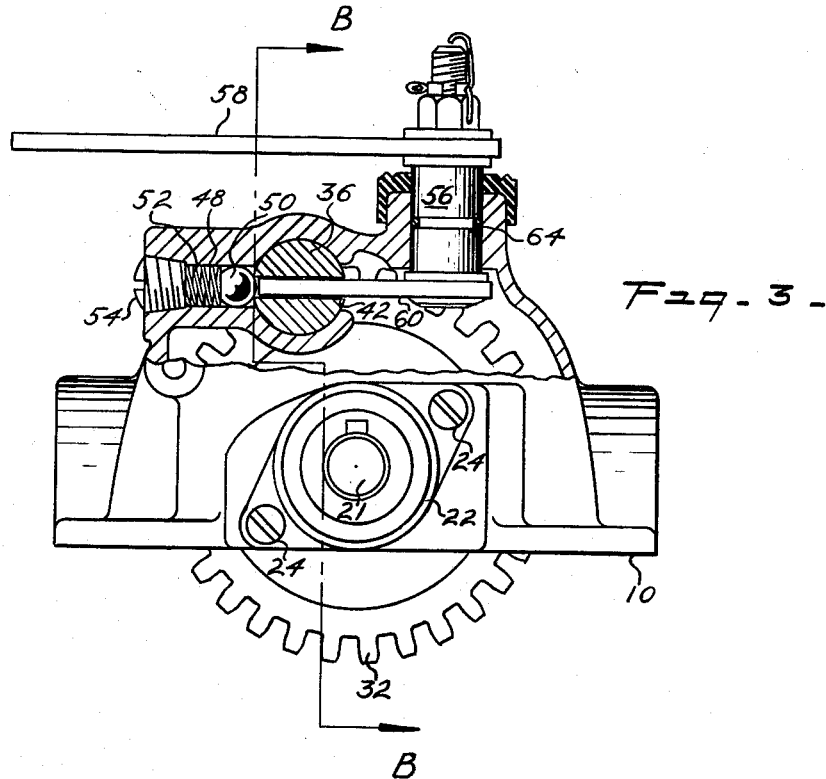
Figure 4:
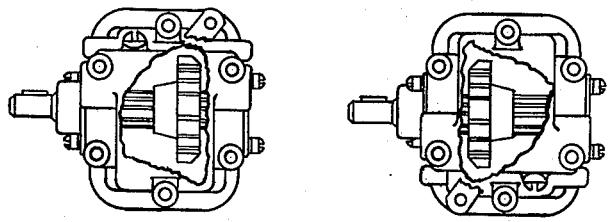
Figure 5:
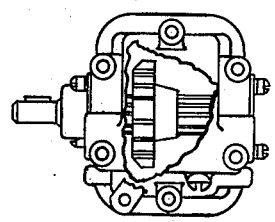

These and other objects of the invention will become apparent when the invention is considered in light of the accompanying specification and drawing wherein:

Fig. 1 is a cross-section elevation of the invention taken along the line B—B of Fig. 3, Fig. 2 is a plan view of the invention with a cross-section insert showing the ball detent, Fig. 3 is a partial cross-section elevation taken along the line A—A of Fig. 1, and Figs. 4 and 5 are plan views of the invention disclosing the various ways the shaft and gear may be mounted within the power take-off housing.

Referring to the drawings, the power take-off comprises a casing or housing 10 in which is located a bore 12 and an inner space 14 which opens into bore 12. A shaft 16 is rotatably supported in housing 10 and passes through space 14. Shaft 16 is supported by needle bearings 18 and thrust bearing 26 and is provided with a keyed portion 21. Needle bearings 18 are mounted in bearing caps 22 which are inserted in suitable bores in housing 10 and held in place by screws 24. An oil seal 26 seals one bearing cap while plug 28 seals the other bearing cap.

Shaft 16 is splined as at 30 and a gear 32 is slidably keyed to shaft 16 by a splined bore.

Housing 10 is adapted to be bolted to a gear or transmission casing by means of bolts extending through holes 34. When the housing 10 is in place the gear 32 will project into the transmission casing for engagement with a drive gear located within the casing, all in a well known manner.

An axially movable shifter bar 36, located within the bore 12, is formed with two arcuate recesses 38 and 40 which intersect a slot 42. Slot 42 terminates in an end wall 43. A pin 44 passes through slot 42 for a purpose later described. A groove 46 is also provided in bar 36 and gear 32 fits within this groove.

Within a bore 48 is located a ball 50, spring 52 and threaded plug 54 which constitute a ball detent which may selectively engage recesses 38 and 40.

Rotatably mounted within housing 10 is a shaft 56. A handle 58 is fixed to the outer end of shaft 56 and an arm 60 is fixed to the inner end of the shaft. Arm 60 is formed with bevel edges 62 and 62' and extends into slot 42 of shifter bar 36.

Seal 64 is used to prevent oil from escaping past shaft 56 and plugs 66 enclose the ends of bore 12.

Suitable remote control operating means are attached to handle 58 for manual operation and the auxiliary equipment such as a pump, winch, etc., is keyed to portion 21.

The operation is as follows:

The housing 10 is bolted to gear casing of the truck, tractor, or the like, with gear 32 extending into the casing and the auxiliary equipment is keyed to portion 21. As viewed in Fig. 1, the gear 32 will be in engagement with a drive gear within the gear casing when gear 32 is in the leftmost position, as shown. When gear 32 is moved to the right it will be disengaged from the drive gear.

Gear 32 is moved on splined shaft 16 by shifter bar 36 through engagement of gear 32 with groove 46. Shifter bar 36 is moved axially by means of arm 60 which is in turn operated by handle 58 through shaft 56. Pin 44 encloses arm 60 within slot 42 and it will be seen that the distance from pin 44 to wall 43 is greater than the width of arm 60 thereby giving the arm 60 lost motion effect in relation to shifter bar 36.

When the shifter bar 36 is in the position as shown in Fig. 2 the gear 32 will be in engagement with the drive gear and ball 50 is seated in recess 38 thereby positively holding the shifter bar 36 and gear 32 in selected position. The depth of recesses 38 and 40 is equal to or greater than the radius of ball 50 thereby insuring a positive locking action. When arm 60 is rotated counterclockwise, as shown in Fig. 2 the bevel edge 62 will first contact ball 50 and substantially lift ball 50 from the recess 38. Continued rotation of arm 60 will hold ball 50 out of the recess 38 sufficient to break the locking action of the ball and the arm will contact pin 44 thereby forcing shifter bar 36 and gear 32 to the right which declutches the power take-off from the drive gear of the gear casing or transmission. Motion of arm 60 will continue until ball 50 falls into recess 40 which positively locks gear 32 in the disengaged position.

When clutching the power take-off, the arm 60 is moved clockwise (Fig. 2) by handle 58. Beveled edge 62' lifts ball 50 from recess 40 and arm 60 contacts wall 43 forcing shifter bar 36 and gear 32 to the left and meshing gear 32 with the drive gear. The edges of the teeth of gear 32 are rounded as at 68 to facilitate this engagement. Movement of gear 32 to the left continues until ball 50 engages recess 38.

Arm 60 performs a double function in that by placing the arm 60 within a slot in shifter bar 36 the need of a key to prevent the shifter bar from rotating is eliminated.

As the disclosed power take-off unit may be used with a variety of gear casings or transmissions, the holes 36 are arranged in a standard SAE mounting permitting the housing 10 to be readily mounted on existing gear casings in one of two positions, e.g. the housing 10 may be mounted with the shifter bar 36 above or below shaft 16.

Since the drive gears of some transmissions or gear casings may be located in different relative positions to the gear 32 it is necessary to adapt the power take-off unit to the particular drive gear arrangement. For instance, in Fig. 1, gear 32 must be moved to the left to engage the drive gear. However, some transmissions may be such that gear 32 must move to the right to mesh with the drive gear. To adapt the power take-off unit to this type of arrangement and still maintain the proper position of keyed portion 21 the shaft 16 is removed from the housing 10 by unfastening bearing caps 22 and inserted into the housing 10 from the other direction, gear 32 is replaced on shaft 16 with the rounded edges 68 still to the left (Fig. 1) bearing caps 22 are put in place and tightened and housing 10 is bolted to the gear casing in the proper position. Thus, since shaft 16 may be reversed and housing 10 may be mounted in the gear casing with the shifter bar 36 above or below shaft 16, the Figs. 4 and 5 illustrate how the shaft 16 and gear 32 will be assembled in the housing 10 in either of the above described constructions, in Fig. 4 the clutching movement of the gear 32 would be to the right while movement of gear 32 to the left in Fig. 5 will accomplish engagement with the drive gear of the gear casing, thus, it is seen that the power take-off unit may be adapted to various types of transmissions without using additional parts and in a simple and efficient manner.

It is thus observed that I have produced a power take-off of simple construction which may be installed with ordinary hand tools and adapted to various types of gear casings.

I claim:

A power take-off apparatus comprising a housing, a splined shaft rotatably supported in said housing having a portion extending therefrom, a gear slidably mounted on said spline and keyed thereto, a shifter bar slidably mounted in said housing parallel to said shaft, a transversely disposed groove defined in said shifter bar receiving a portion of said gear, axially spaced depressions formed in said shifter bar, a longitudinally disposed slot diametrically extending through said bar and intersecting said depressions, abutment means within said slot, detent means yieldably mounted within said housing adapted to alternately engage said depressions, a second shaft rotatably mounted within said housing, an operating handle affixed to one end of said second shaft, an actuating arm affixed to the other end of said second shaft and extending into said slot intermediate said abutment means, said arm extending into said slot a distance sufficient to intersect the depression in which the detent is engaged in opposed relation to said yieldably mounted detent means and in a lost motion connection with said abutment means whereby rotation of said handle will pivot said arm about said second shaft to first cause a portion of said arm to contact and remove said detent from the engaged depression and subsequently cause said arm to engage one of said abutment means to axially shift said bar and hence axially translate said gear on said splined shaft.

References Cited in the file of this patent

UNITED STATES PATENTS

| | | |
|---|---|---|
| 1,446,326 | Asproth | Feb. 20, 1923 |
| 1,557,628 | Sweet | Oct. 20, 1925 |
| 1,639,812 | Riach | Aug. 23, 1927 |
| 2,162,979 | Simpson | June 20, 1939 |
| 2,578,867 | Wagner | Dec. 18, 1951 |
| 2,636,390 | Wagner | Apr. 28, 1953 |
| 2,696,728 | Jewett et al. | Dec. 14, 1954 |

FOREIGN PATENTS

| | | |
|---|---|---|
| 570,440 | Great Britain | July 6, 1945 |